US010127565B2

United States Patent
Phan

(10) Patent No.: US 10,127,565 B2
(45) Date of Patent: Nov. 13, 2018

(54) DISPLAYING MOBILE ADVERTISING BASED ON DETERMINING USER'S PHYSICAL ACTIVITY FROM MOBILE DEVICE SENSOR DATA

(75) Inventor: Thomas Phan, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 509 days.

(21) Appl. No.: 13/585,740

(22) Filed: Aug. 14, 2012

(65) Prior Publication Data

US 2013/0151343 A1    Jun. 13, 2013

Related U.S. Application Data

(60) Provisional application No. 61/569,136, filed on Dec. 9, 2011, provisional application No. 61/578,827, filed on Dec. 21, 2011.

(51) Int. Cl.
*G06Q 30/02*    (2012.01)
*H04W 4/02*    (2018.01)
*H04W 4/00*    (2018.01)
*H04W 4/21*    (2018.01)

(52) U.S. Cl.
CPC ............. *G06Q 30/02* (2013.01); *H04W 4/02* (2013.01); *H04W 4/00* (2013.01); *H04W 4/21* (2018.02)

(58) Field of Classification Search
CPC ................................................. G06Q 30/0251
See application file for complete search history.

(56) References Cited

U.S. PATENT DOCUMENTS

| 6,091,956 A * | 7/2000 | Hollenberg ............ G06Q 30/02 455/456.5 |
| 2006/0293921 A1* | 12/2006 | McCarthy ............ A61B 5/6815 705/2 |
| 2008/0146892 A1* | 6/2008 | LeBoeuf .................. A61B 5/11 600/300 |
| 2009/0197236 A1* | 8/2009 | Phillips, II ............... G09B 7/00 434/350 |

(Continued)

FOREIGN PATENT DOCUMENTS

| CN | 102067578 A | 5/2011 |
| CN | 102132588 A | 7/2011 |

(Continued)

OTHER PUBLICATIONS

European Search Report dated Mar. 21, 2013 for European Application No. 12196372.2 from European Patent Office, pp. 1-6, Munich, Germany.

(Continued)

*Primary Examiner* — David J Stoltenberg
*Assistant Examiner* — Brendon Beheshti
(74) *Attorney, Agent, or Firm* — Sherman IP LLP; Kenneth L. Sherman; Steven Laut

(57) ABSTRACT

A mobile handset device determines a physical activity performed by a user based on local sensor data. The local sensor data can include sensors within the mobile handset device and local sensors in communication with the mobile handset device. The mobile handset device provides an indicator of the physical activity to a publisher. The publisher targets advertisements based on the current activity or activity pattern of the user.

9 Claims, 3 Drawing Sheets

(56) References Cited

U.S. PATENT DOCUMENTS

| | | | |
|---|---|---|---|
| 2009/0216682 A1* | 8/2009 | Foladare | G06Q 30/02 705/80 |
| 2009/0222344 A1* | 9/2009 | Greene | G06Q 10/04 705/14.49 |
| 2010/0121716 A1* | 5/2010 | Golan | G01S 5/0027 705/14.58 |
| 2011/0066498 A1* | 3/2011 | Wojcicki | G06Q 30/02 705/14.55 |
| 2011/0159857 A1* | 6/2011 | Faith | G06Q 30/0201 455/414.3 |
| 2011/0231243 A1* | 9/2011 | Bhatia | G06Q 30/02 705/14.43 |

FOREIGN PATENT DOCUMENTS

| | | |
|---|---|---|
| JP | 2006258978 A | 9/2006 |
| KR | 2011004326 A | 4/2011 |

OTHER PUBLICATIONS

Bao, Ling et al., "Activity Recognition from User-Annotated Acceleration Data," A. Ferscha and F. Mattern (Eds.): Pervasive 2004, LNCS 3001, pp. 1-17, 2004.

Lester, Jonathan et al., "A Practical Approach to Recognizing Physical Activities," K.P. Fishkin et al. (Eds.): Pervasive 2006, LNCS 3968, pp. 1-16, 2006.

Kwapisz, Jennifer R. et al., "Activity Recognition using Cell Phone Accelerometers," SensorKDD '10, Jul. 25, 2010, Washington, DC, USA.

European Office Action dated Feb. 6, 2017 for European Application No. 12196372.2 from European Patent Office, pp. 1-4, Munich, Germany.

Chinese Office Action dated Dec. 22, 2016 for Chinese Application No. 201210530384.9 from China Patent Office, pp. 1-16, Beijing City, China (English-language translation attached, pp. 1-11).

Chinese Office Action dated Dec. 25, 2017 for Chinese Application No. 201210530384.9 from China Patent Office, pp. 1-43, Beijing City, China (English-language translation attached, pp. 1-10).

Chinese Office Action dated Sep. 13, 2017 for Chinese Application No. 201210530384.9 from China Patent Office, pp. 1-15, Beijing City, China (English-language translation attached, pp. 1-11).

Korean Office Action dated Sep. 7, 2018 for Korean Patent Application No. 20120127867 from Korean Patent Office, pp. 1-18, Seoul, Republic of Korea (English-language translation attached, pp. 1-10).

* cited by examiner

DISPLAYING MOBILE ADVERTISING BASED ON DETERMINING USER'S PHYSICAL ACTIVITY FROM MOBILE DEVICE SENSOR DATA

CROSS REFERENCE TO RELATED APPLICATIONS

This application claims the benefit of priority under 35 U.S.C. § 119(e) to U.S. Provisional Patent Application No. 61/569,136, filed on Dec. 9, 2011, and U.S. Provisional Patent Application No. 61/578,827, filed on Dec. 21, 2011, both of which are incorporated herein by reference in its entirety for all purposes.

FIELD OF THE INVENTION

The present invention is generally related to the field of providing advertisements on mobile devices, such as smartphones. More particularly, the present invention is directed to targeting advertisements to mobile devices based on the activities performed by the user of the mobile device

BACKGROUND OF THE INVENTION

In the context of mobile advertising, graphical or text advertising creatives are displayed on a user's mobile handset. The creative is provided by an advertiser (e.g. Coca-Cola®, Toyota®, etc.) and is delivered through an advertising platform owned by a publisher (e.g. Google®, Apple®, AdBrite®, etc.). The creative is rendered on the mobile handset either through a web browser or through a native application.

The desired goal of both the advertiser and the publisher is to have the creative displayed to the user at an opportune time when the user has a high interest in the product or service being advertised. If the user is interested, then he will click on the ad (which is relevant for cost-per-mille, cost-per-click, or cost-per-action advertisement campaigns), or remember the product or service at a later time (which is relevant for branding campaigns).

However, conventional mobile advertising approaches are limited in their ability to determine a user's interest, and target advertisements at optimum times based on their interest. Currently, mobile advertisements are scheduled to be displayed to the user with relevancy determined by a plurality of techniques, including but not limited to: search keywords provided by the user; or search content context, such as from the body of email or webpage text. Thus, in conventional approaches, the user's interest is determined by search keywords provided by the user, or from text read by the user. Geographical information (such as location information derived from cell phone towers or Global Positioning System (GPS) coordinates) may be used as an additional factor to limit advertisements to businesses close to the user. For example, in conventional mobile advertising, suppose a user inputs a search query for "restaurants" on their smartphone. In response to the "restaurant query," the user would receive advertisements for restaurants, which might further be limited geographically to nearby restaurants within a small radius.

However, suppose that a mobile phone user does not input search queries (or receive content related to their interest that can be searched). For this situation, conventional mobile advertising techniques have difficulty in providing advertising creatives based on the actual interests of the user of the smartphone. Even if a user eventually inputs queries, this may occur at a time when a user's interest is not the highest. For example, a user of a mobile device might go out for a run to exercise and have a passionate interest in buying better running shoes during the run, but not perform a search query for some weeks or months later when their interest level is lower. In this situation, the advertising creative might not be received at the optimum time.

SUMMARY OF THE INVENTION

A mobile handset device monitors local sensor data. The local sensor data is used to determine a physical activity performed by the user. An indicator of a current activity or activity pattern is sent to a publisher. The publisher uses the indicator to target advertisements based on activity.

In one embodiment of a method, the mobile handset device monitors sensor data from sensors proximate to the mobile handset device. The mobile handset device determines a physical activity being performed by the user based on the sensor data. This determination can be based on a statistical model based on training data for a set of different physical activities. The mobile handset device transmits an indicator of the activity being performed to a publishing entity. The mobile handset device then receives from the publishing entity at least one advertisement selected based, at least in part, on the physical activity performed by the user of the mobile handset device.

In one embodiment, a mobile handset device includes a set of sensors, a processor and a memory. The mobile handset device is configured to monitor the sensors, determine a physical activity performed by the user of the mobile handset device, and transmit an indication of the physical activity to a remote entity providing advertisement to the mobile handset device.

DETAILED DESCRIPTION

Figure 1:
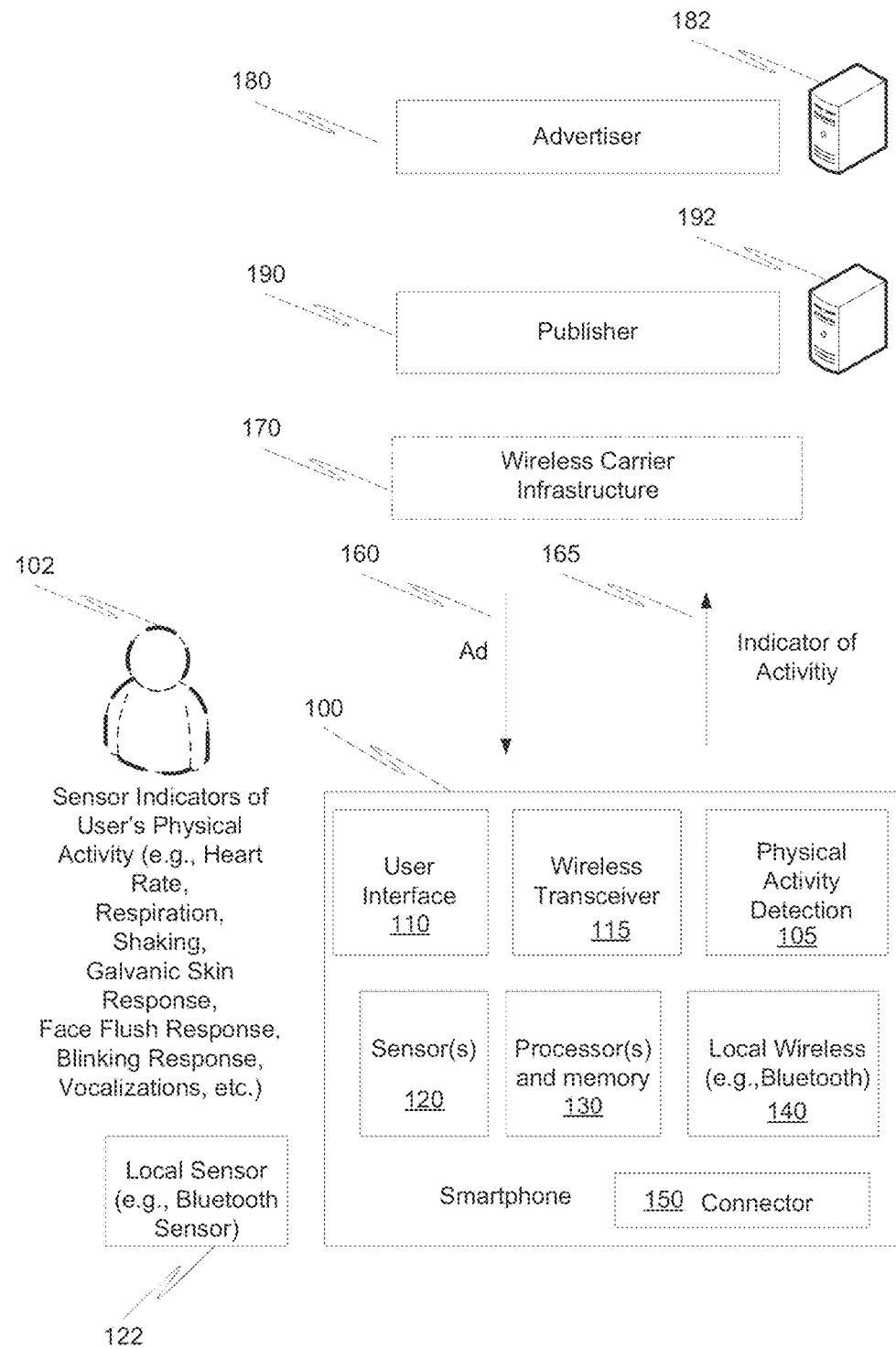
FIG. 1 illustrates a system for delivering advertisements based on a user's activities that includes a mobile handset device in which the mobile handset device determines activities performed by the user in accordance with an embodiment of the present invention.

FIG. 1 illustrates a mobile handset device 100 (e.g., a smartphone) in accordance with an embodiment of the present invention. The mobile handset device 100 determines the user's activity, which permits mobile advertising creatives to be targeted to the user based on the user's current physical activity, recent physical activity, or pattern of physical activity.

The mobile handset device 100 includes a wireless transceiver 115, user interface 110, processor and memory 130, and sensors 120. Additionally, the mobile handset device 100 has a local wireless link 140 and a wired connector 150, which permits an interface with a local sensor 122. An activity detection module 105 monitors sensors 120 or 122. User activity or activity pattern is derived entirely from the data read through sensors 120 built into the mobile handset device 100 (such as the accelerometer, gyroscope, GPS receiver, and barometer), or through sensors 122 connected over a wireless medium (such as heart-rate monitors and galvanic skin response sensors connected through Bluetooth or Ant+), or through a combination of sensors 120 and 122.

The activity detection module 105 generates an indicator of the activity. In one embodiment this may take the form of one or more keywords. However, it will also be understood that in alternate embodiments, this include other types of information, such as a summary of sensor data.

Thus, whenever the user 102 engages in a physical activity and has their mobile handset device with them, the sensors provide information from which an inference can be made regarding what type of physical activity the user is engaging in. For example, studies by the inventor indicate that jogging generates a different accelerometer response than walking, bicycling, sitting, standing, or driving a car. For example, bicycling generates frequency harmonics associated with pedal movement. Additionally, sensor data from two or more different sensors can be considered in combination, such as combining heart-rate sensor data, accelerometer data, barometer data, and location features to refine the determination of the activity that the user is engaged in.

A wide variety of different physical activities can be classified by analyzing the sensor responses. As the user interacts with the mobile handset device 100, the sensors collect relevant sensor data, which is then analyzed on the device in real-time to determine the user's activity. The resulting activity then triggers the selection of advertisements that are appropriate for that activity.

An advertiser 180 provides advertising creatives which may, for example, be stored and provided from a server 182. A publisher of content publishes content, and also serves ads to individual mobile handset devices. The publisher may also have a server 192 to serve content. Thus, in the example of FIG. 1, an indicator of activity 165 (e.g., one or more keywords associated with a detected activity) is transmitted from the mobile handset device 100 to the publisher 100 via the wireless carrier infrastructure 170. In response, an ad targeted to the activity is served to the mobile handset device 100 as indicated by arrow 160. The system thus determines the user's activity to find an appropriate advertising creative to be displayed. For example, a user who is currently running with his smartphone can have his activity (e.g. "running") determined by this system. In another example, a user who tends to run on a specific day or time can have his activity pattern (e.g. "running on Tuesdays") determined by the system. The perceived activity or activity pattern is then used as an input by the publisher and the advertiser for advertisement selection, which returns appropriate advertisements, such as those for running shoes or athletic apparel. In one implementation, a user is given the option to opt-in to the program to enhance privacy protection.

In one embodiment, the operation of the entire system includes three phases: advertising setup, training, and classification.

In the advertising setup phase, advertisers establish the activities that they want associated with their advertisements. For example, an athletic apparel company establishes that activities for "running" or "playing basketball" should trigger the company's advertisements. This association is given to the advertising publisher as part of the contractual advertisement agreement.

In the training phase, a statistical model is built from training data recorded from test participants who use a mobile handset device (e.g., a smartphone) to record their physiological response to activities. For example, if advertisers establish that "basketball" is an activity they want associated with an advertisement, then in a training phase, the test participants need to play basketball while carrying their smartphones to gather sensor data for a particular activity, such as running. In one implementation, during the training phase, each activity is labeled, either by a training participant or by the system developer (and in both cases, either at the time the activity is recorded or later when the activity is recollected). The output of the training phase is a mapping of sensor data to the labeled activity and can take the form of a decision tree, a Support Vector Machine model, or other model appropriate for a machine learning algorithm. The model is created either by the publisher, a third party that builds the model and sells it, the smartphone vendor, or another party.

In the classification phase, the statistical model built from the training phase is deployed to mobile handset devices 100 and used to classify new sensor data captured on the mobile handset device 100. The output of the classification phase is the user's perceived activity. This activity is then used by the advertising publisher to select an advertisement to be displayed on the user's mobile handset device 100.

Figure 2:
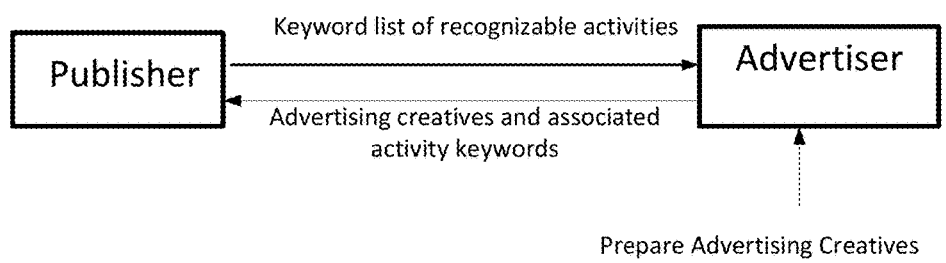
FIG. 2 illustrates an advertising setup phase in accordance with an embodiment of the present invention.

FIG. 2 illustrates an advertising setup phase in accordance with an embodiment of the present invention. An advertiser prepares a set of advertising creatives to be displayed. The publisher provides to the advertiser a list of activity keywords that the system can recognize. The advertiser associates one or more activity keywords with each advertising keyword and submits all associations to the publisher as part of the contractual agreement for displaying the advertiser's creatives.

Figure 3:
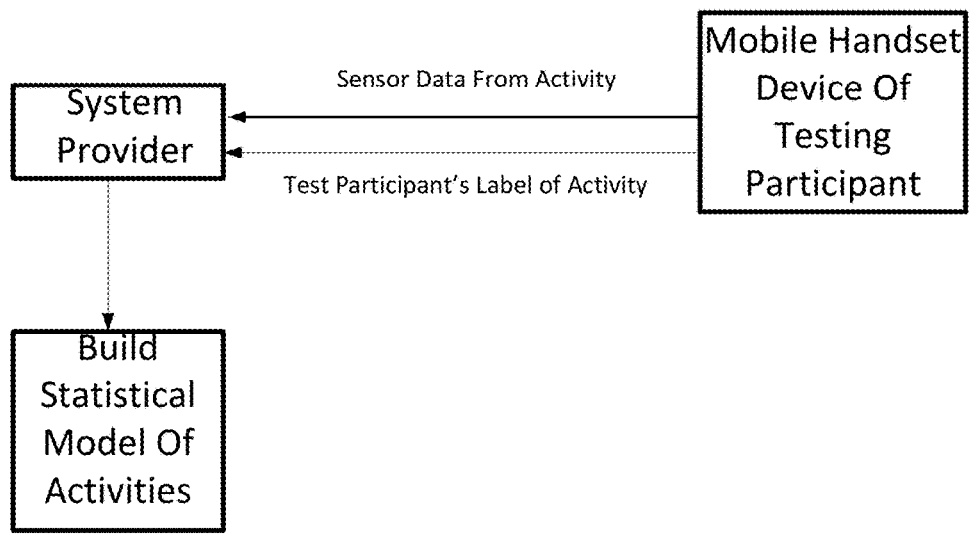
FIG. 3 illustrates a training phase in accordance with an embodiment of the present invention.

FIG. 3 illustrates a training phase in accordance with an embodiment of the present invention. The system provider (e.g. the advertising publisher, the smartphone vendor, or other provider) creates sensor-recording software on the mobile handset devices used by each training participant to record sensor input and to allow training participants to select an associated activity. The recorded sensor input can include, but is not limited to, an accelerometer, a gyroscope, a microphone, a barometer, a GPS receiver, and a heart-rate monitor.

Each training participant activates the mobile handset device's software to record sensor data. In a preferred implementation, the training participant performs activities and associates this performance with a label (e.g. "running") in the software while this software records the sensor data. Alternately, activities are labeled after the participant completes his physical activity by recollecting what he did earlier. The system provider retrieves the labeled training data from all training participants.

The system provider builds a statistical model that maps the sensor data to the activity labels. In this step, features are extracted from the training data. Such features can include, but are not limited to, accelerometer features (such as the maximum-amplitude frequency and frequency-domain coefficients), microphone features (such as the maximum-amplitude frequency and frequency-domain coefficients), barometer features (such as air pressure), location features (such as the correct longitude and latitude), and heart-rate features (such as the current heart-rate). These features and the label activity are then given as inputs into a machine learning algorithm, such as for a decision tree, support vector machine, maximum entropy, or k-nearest-neighbor.

Figure 4:
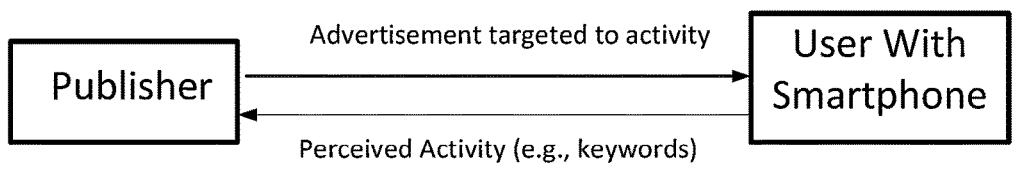
FIG. 4 illustrates a classification phase in accordance with an embodiment of the present invention.

FIG. 4 illustrates a classification phase after deployment has occurred in accordance with an embodiment of the present invention. Classification software that accepts the statistical model developed during the training phase, and the user's current sensor data, is written and deployed onto a smartphone. The software is activated and runs in the background of a smartphone. The software classifies the user's sensor data using the statistical model and produces a perceived activity. In a preferred implementation of the invention, the software returns the perceived activity as keywords, such as "running" or "playing basketball" to the advertisement publisher, which then uses those keywords to select from a set of candidate advertisements for rendering a creative. In another implementation of the invention, the software saves the current activity to create a long-term pattern. For example, the system can increment a counter each time the user runs on each day of the week, and if the user was perceived as running on Tuesdays to occur 50% more often than any other day, then the pattern "running on Tuesdays" is saved. In this case, the user's pattern(s) are returned to the advertisement publisher, which then uses the patterns to select from a set of candidate advertisements.

In one implementation, the software to monitor activity can be designed to minimize battery consumption. For example, it can run only when a Web browser is active rather than continuously in the background.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention, as defined by the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of providing mobile advertising to a mobile handset device having a processor and a memory, comprising:
   processing a model encoded on the mobile handset device, the model including a decision tree comprising activity labels and frequency domain features extracted from sensor data;
   capturing, at the mobile handset device, new sensor data from a combination of sensors connected to the mobile handset device;
   classifying, at the mobile handset device, the new sensor data as a perceived activity from a physical activity of a user of the mobile handset device, the classifying comprising inputting the new sensor data to the model, and outputting one of the activity labels indicating the perceived activity;
   generating one or more keywords as an indicator of the perceived activity based on said classifying;
   transmitting the one or more keywords to a server; and
   receiving at least one advertisement selected based on at least one advertising keyword associated with the indicator.

2. The method of claim 1, further comprising displaying the at least one advertisement on a display of the mobile handset device.

3. The method of claim 1, wherein the sensors reside within the mobile handset device.

4. A non-transitory processor-readable medium that includes a program that when executed by a processor performs a method comprising:
   processing a model encoded on a mobile handset device, the model including a decision tree comprising activity labels and frequency domain features extracted from sensor data;
   capturing, at the mobile handset device, new sensor data from a combination of sensors connected to the mobile handset device;
   classifying, at the mobile handset device, the new sensor data as a perceived activity from a physical activity of a user of the mobile handset, the classifying comprising inputting the new sensor data to the model, and outputting one of the activity labels indicating the perceived activity;
   generating one or more keywords as an indicator of the perceived activity based on said classifying;
   transmitting the one or more keywords to a server; and
   receiving at least one advertisement selected based on at least one advertising keyword associated with the indicator.

5. The non-transitory processor-readable medium of claim 4, wherein the indicator indicates a pattern for the perceived activity based on sensor data collected over time for a particular week day.

6. The method of claim 1, wherein the model is built by:
   partitioning training sensor data samples using at least one window;
   determining per window magnitude frequency response for the partitioned training sensor data samples; and
   extracting the frequency domain features from the per window magnitude frequency response for the partitioned training sensor data samples.

7. The method of claim 6, wherein the one of the activity labels output from the model comprises a JavaScript event that is output as an activity predicate on the mobile handset device.

8. The non-transitory processor-readable medium of claim 4, wherein the model is built by:
   partitioning training sensor data samples using at least one window;
   determining per window magnitude frequency response for the partitioned training sensor data samples; and
   extracting the frequency domain features from the per window magnitude frequency response for the partitioned training sensor data samples.

9. The non-transitory processor-readable medium of claim 8, wherein the one of the activity labels output from the model comprises a JavaScript event that is output as an activity predicate on the mobile handset device.

* * * * *